R. WHALEY.
BICYCLE SADDLE SUPPORT.
APPLICATION FILED JULY 14, 1916.
1,205,828.
Patented Nov. 21, 1916.
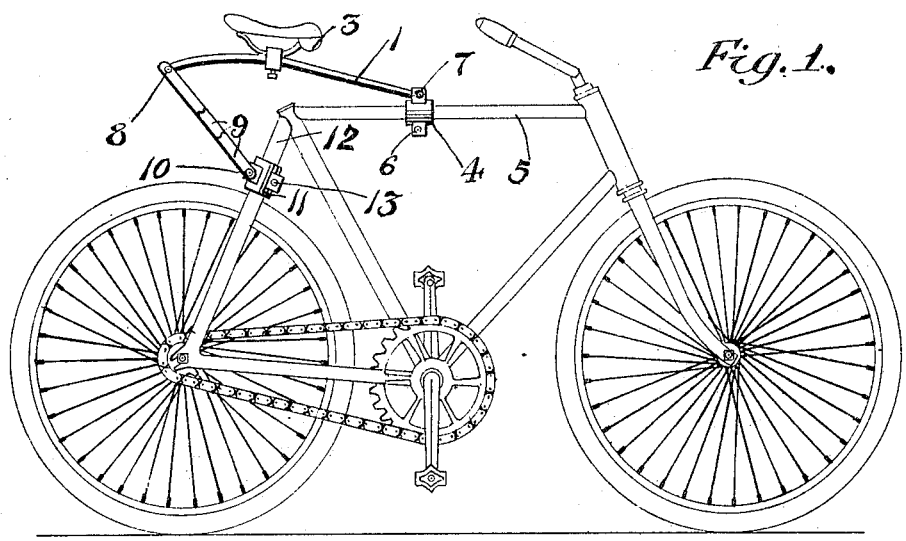
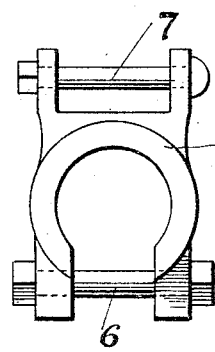
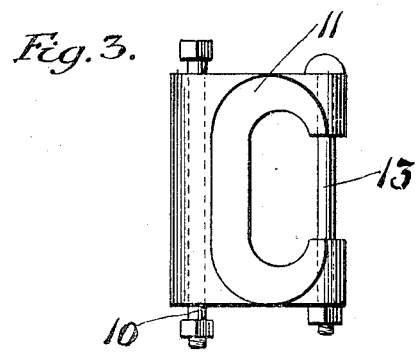
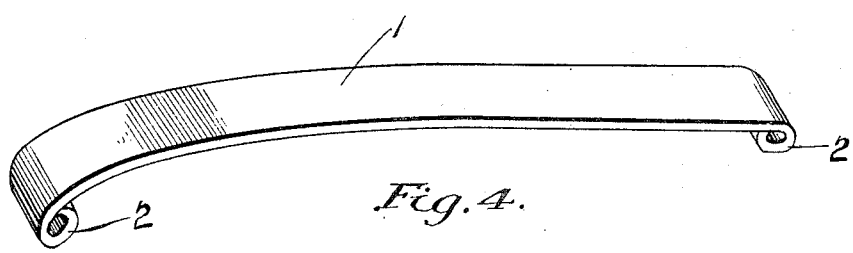
Inventor
Russell Whaley
By Victor J. Evans
Attorney
Witnesses
A. J. Stenner
R. M. Smith

UNITED STATES PATENT OFFICE.

RUSSELL WHALEY, OF BEAUX ARTS, WASHINGTON.

BICYCLE-SADDLE SUPPORT.

1,205,828.         Specification of Letters Patent.         Patented Nov. 21, 1916.

Application filed July 14, 1916. Serial No. 109,328.

*To all whom it may concern:*

Be it known that I, RUSSELL WHALEY, a citizen of the United States, residing at Beaux Arts, in the county of King and State of Washington, have invented new and useful Improvements in Bicycle-Saddle Supports, of which the following is a specification.

This invention relates to bicycle saddle supports, the object in view being to provide yieldable saddle supporting means embodying a spring and novel means for adjustably connecting said spring to certain members of the frame of the machine, whereby the support may be adjusted to different loads or persons of different weights, also adjusted in a fore and aft direction into the desired relation to the pedals of the crank shaft and also adjusted longitudinally of the spring for obtaining greater or less flexure of the spring in accordance with the desire of the rider and the nature of the roads to be negotiated.

A further object of the invention is to produce a saddle support of the general character referred to which is of light weight, economical in construction and by means of which the saddle supported thereby may be raised and lowered to suit any particular rider.

With the above and other objects in view, the invention consists in the novel construction, combination and arrangement of parts, as herein described, illustrated and claimed.

In the accompanying drawings: Figure 1 is a side elevation of a bicycle showing the saddle support of this invention in its applied relation thereto. Fig. 2 is a detail view of the clamp at the forward end of the device. Fig. 3 is a similar view of the clamp for the rear part of the saddle support. Fig. 4 is a detail perspective view of the spring.

Referring to the drawings 1 designates a spring of any desired length and composed of one or more leaves as may be desired or required according to the weight of the rider. The spring 1 is provided at its opposite extremities with eyes or knuckles 2 and a saddle 3 of any usual or preferred construction is adjustably fastened to the spring 1 in order that said saddle may be moved toward either end of said spring or adjusted in a fore and aft direction in relation to the machine.

The forward end of the spring 1 is pivotally connected to a clamp 4 which is of the form illustrated in Fig. 2 adapting it to be clamped around the top bar 5 of the machine frame by means of a clamping bolt 6, 7 designating a pivot bolt which connects the forward end of the spring pivotally to the forward clamp 4. It will be understood that the clamp 4 may be adjusted longitudinally of the frame bar 5 in order to correspondingly shift the saddle 3 or to give greater or less elevation to the rear end of the saddle supporting spring as will hereinafter appear.

The rear extremity of the spring 1 has pivotally connected thereto by means of a bolt 8 a pair of downwardly extending and forwardly inclined links 9 which are connected by a pivot bolt 10 to a second clamp 11 which embraces the rearwardly sloping rear frame bar or forked brace 12 and which is clamped in fixed relation thereto by means of a bolt 13. This provides a pivotal connection between the links 9 and the clamp 10. All of the joints 7, 8 and 10 are of a pivotal type. Therefore, as the spring 1 flexes, a swinging movement is imparted to the links 9 which move upwardly or downwardly as the case may be. By loosening the clamping bolt 13, the rear clamp 11 may be adjusted up and down upon the frame member 12 therefore giving greater or less elevation to the saddle 3 and also enabling the tilt or inclination of said saddle to be varied to suit any particular rider.

From the foregoing description, taken in connection with the accompanying drawings, it will now be understood that by means of the clamp 11 the links 9 may be raised or lowered and the spring 1 and saddle 3 given a corresponding elevation or depression. Furthermore, by adjusting the clamp 4 longitudinally of the bar 5, the saddle 3 may be correspondingly adjusted in a fore and aft direction. Thus the saddle 3 may be brought into any desired relation to the operating pedals of the machine and also the handle bar. The construction of the saddle support is inexpensive, less complicated than the ordinary saddle supporting structures now in common use, renders the machine easy riding, and is capable of being adjusted to suit different riders.

I claim:—

The combination with the top horizontal frame bar of a bicycle, and the rearwardly inclined frame bar thereof, of a saddle support in the form of a spring extending in a fore and aft direction, a clamp adjustable longitudinally of the top bar of the frame and having the front end of said spring pivotally attached thereto, a second clamp adjustable longitudinally of said rearwardly inclined frame bar, and a pivotal link connection between said second clamp and the rear extremity of said spring.

In testimony whereof I affix my signature.

RUSSELL WHALEY.

Copies of this patent may be obtained for five cents each, by addressing the "Commissioner of Patents, Washington, D. C."